(12) United States Patent  
Gruenwald

(10) Patent No.: US 7,698,283 B2
(45) Date of Patent: Apr. 13, 2010

(54) SYSTEM AND METHOD FOR ORGANIZING DATA

(75) Inventor: Bjorn J. Gruenwald, Newtown, PA (US)

(73) Assignee: PriMentia, Inc., Wilmington, DE (US)

( * ) Notice: Subject to any disclaimer, the term of this patent is extended or adjusted under 35 U.S.C. 154(b) by 691 days.

(21) Appl. No.: 10/198,935

(22) Filed: Jul. 22, 2002

(65) Prior Publication Data

US 2002/0194176 A1 Dec. 19, 2002

Related U.S. Application Data

(63) Continuation of application No. 09/357,301, filed on Jul. 20, 1999, now Pat. No. 6,424,969.

(51) Int. Cl.
*G06F 7/00* (2006.01)
*G06N 5/00* (2006.01)

(52) U.S. Cl. .............. 707/100; 707/102; 707/104.1; 706/45

(58) Field of Classification Search .............. 707/1–10, 707/100–102, 104.1, 200–201; 705/28; 706/45–46
See application file for complete search history.

(56) References Cited

U.S. PATENT DOCUMENTS

| | | | | |
|---|---|---|---|---|
| 3,775,753 A | | 11/1973 | Kastner | 340/172.5 |
| 4,068,300 A | * | 1/1978 | Bachman | 707/1 |
| 4,281,391 A | | 7/1981 | Huang | 708/491 |
| 4,414,629 A | | 11/1983 | Waite | 705/28 |
| 4,635,199 A | | 1/1987 | Muraki | |
| 4,779,192 A | | 10/1988 | Torii et al. | 364/200 |
| 4,780,810 A | * | 10/1988 | Torii et al. | 712/6 |
| 4,792,793 A | * | 12/1988 | Rawlinson et al. | 341/89 |
| 4,864,503 A | | 9/1989 | Tolin | |
| 5,148,541 A | * | 9/1992 | Lee et al. | 707/2 |
| 5,212,639 A | * | 5/1993 | Sampson et al. | 705/30 |
| 5,226,158 A | | 7/1993 | Horn et al. | |
| 5,241,648 A | | 8/1993 | Cheng et al. | |
| 5,274,777 A | | 12/1993 | Kawata | |

(Continued)

FOREIGN PATENT DOCUMENTS

EP  0 079 465  5/1983

(Continued)

OTHER PUBLICATIONS

Standish, T.A., "Data Structure Techniques", 1980, XP002217996, pp. 8-11.

(Continued)

*Primary Examiner*—Miranda Le
(74) *Attorney, Agent, or Firm*—Womble Carlyle Sandridge & Rice, PLLC

(57) ABSTRACT

A system and method for organizing raw data from one or more sources. The content of the raw data is converted into an appropriate number system and stored in a format that facilitates the use of efficient mathematical operations. The number system is selected to handle each of the various elements, characters, or other representative indicia found in the raw data. Furthermore, the number system is selected so that the numerical data retains semantic significance with respect to the raw data. Once converted into the numeric format, the data is processed using various techniques to extract the best information from the raw data into a distilled database.

29 Claims, 9 Drawing Sheets

U.S. PATENT DOCUMENTS

| | | | |
|---|---|---|---|
| 5,287,494 A | 2/1994 | Garcia et al. | |
| 5,303,149 A | 4/1994 | Janigian | |
| 5,471,612 A | 11/1995 | Schlafly | 707/503 |
| 5,481,704 A * | 1/1996 | Pellicano | 707/5 |
| 5,490,061 A | 2/1996 | Tolin et al. | |
| 5,499,359 A | 3/1996 | Vijaykumar | |
| 5,508,538 A | 4/1996 | Fijany et al. | |
| 5,535,300 A | 7/1996 | Hall, II et al. | 704/227 |
| 5,542,087 A | 7/1996 | Neimat et al. | 395/600 |
| 5,559,940 A * | 9/1996 | Hutson | 715/526 |
| 5,603,022 A | 2/1997 | Ng et al. | |
| 5,615,301 A | 3/1997 | Rivers | |
| 5,619,709 A | 4/1997 | Caid et al. | 395/794 |
| 5,621,908 A | 4/1997 | Akaboshi et al. | |
| 5,633,998 A | 5/1997 | Schlafly | 714/1 |
| 5,668,989 A | 9/1997 | Mao | 707/101 |
| 5,678,043 A * | 10/1997 | Ng et al. | 707/101 |
| 5,680,627 A * | 10/1997 | Anglea et al. | 704/1 |
| 5,703,907 A | 12/1997 | James | 375/240 |
| 5,721,899 A | 2/1998 | Namba | |
| 5,745,896 A | 4/1998 | Vijaykumar | |
| 5,751,957 A | 5/1998 | Hiroya et al. | |
| 5,794,178 A | 8/1998 | Caid et al. | 704/9 |
| 5,799,303 A | 8/1998 | Tsuchimura | |
| 5,802,509 A | 9/1998 | Maeda et al. | |
| 5,806,057 A | 9/1998 | Gormley et al. | |
| 5,809,501 A | 9/1998 | Noven | |
| 5,819,251 A * | 10/1998 | Kremer et al. | 707/1 |
| 5,819,268 A | 10/1998 | Hackett | |
| 5,822,743 A | 10/1998 | Gupta et al. | 706/50 |
| 5,841,981 A | 11/1998 | Kondo | |
| 5,877,482 A | 3/1999 | Reilly | 235/380 |
| 5,895,470 A * | 4/1999 | Pirolli et al. | 707/102 |
| 5,924,091 A | 7/1999 | Burkhard | 707/7 |
| 5,926,811 A | 7/1999 | Miller et al. | 707/5 |
| 5,963,642 A * | 10/1999 | Goldstein | 713/193 |
| 5,970,490 A * | 10/1999 | Morgenstern | 707/10 |
| 5,974,407 A | 10/1999 | Sacks | 707/2 |
| 5,978,788 A * | 11/1999 | Castelli et al. | 707/2 |
| 5,983,216 A | 11/1999 | Kirsch et al. | 707/2 |
| 5,987,456 A | 11/1999 | Ravela et al. | |
| 5,991,713 A | 11/1999 | Unger et al. | |
| 6,026,397 A | 2/2000 | Sheppard | 707/5 |
| 6,029,195 A | 2/2000 | Herz | |
| 6,070,164 A * | 5/2000 | Vagnozzi | 707/100 |
| 6,081,811 A * | 6/2000 | Nilsson | 707/201 |
| 6,106,562 A | 8/2000 | Teter et al. | |
| 6,108,670 A | 8/2000 | Weida et al. | 707/203 |
| 6,122,628 A * | 9/2000 | Castelli et al. | 707/5 |
| 6,134,541 A * | 10/2000 | Castelli et al. | 707/2 |
| 6,138,109 A * | 10/2000 | Grichnik et al. | 706/20 |
| 6,138,116 A * | 10/2000 | Kitagawa et al. | 707/5 |
| 6,154,213 A | 11/2000 | Rennison et al. | 345/356 |
| 6,175,828 B1 * | 1/2001 | Kuromusha et al. | 707/3 |
| 6,175,835 B1 | 1/2001 | Shadmon | 707/102 |
| 6,185,567 B1 | 2/2001 | Ratnaraj et al. | 707/10 |
| 6,196,466 B1 * | 3/2001 | Schuessler | 235/494 |
| 6,202,141 B1 * | 3/2001 | Diefendorff et al. | 712/9 |
| 6,208,993 B1 | 3/2001 | Shadmon | 707/102 |
| 6,212,530 B1 * | 4/2001 | Kadlec | 707/201 |
| 6,212,532 B1 * | 4/2001 | Johnson et al. | 715/500 |
| 6,233,546 B1 | 5/2001 | Datig | |
| 6,233,571 B1 * | 5/2001 | Egger et al. | 707/2 |
| 6,236,974 B1 * | 5/2001 | Kolawa et al. | 705/7 |
| 6,249,784 B1 | 6/2001 | Macke et al. | |
| 6,253,188 B1 | 6/2001 | Witek et al. | 705/14 |
| 6,263,334 B1 * | 7/2001 | Fayyad et al. | 707/5 |
| 6,275,789 B1 | 8/2001 | Moser et al. | |
| 6,289,353 B1 * | 9/2001 | Hazlehurst et al. | 707/102 |
| 6,301,579 B1 * | 10/2001 | Becker | 707/102 |
| 6,327,574 B1 * | 12/2001 | Kramer et al. | 705/14 |
| 6,349,309 B1 * | 2/2002 | Aggarwal et al. | 707/200 |
| 6,356,936 B1 | 3/2002 | Donoho et al. | |
| 6,370,513 B1 * | 4/2002 | Kolawa et al. | 705/10 |
| 6,463,404 B1 | 10/2002 | Appleby | |
| 6,493,662 B1 * | 12/2002 | Gillam | 704/9 |
| 6,578,025 B1 * | 6/2003 | Pollack et al. | 707/2 |
| 6,675,166 B2 * | 1/2004 | Bova | 707/10 |
| 6,754,666 B1 * | 6/2004 | Brookler et al. | 707/102 |
| 6,910,183 B2 * | 6/2005 | Maier et al. | 715/205 |
| 6,978,788 B2 * | 12/2005 | Klimberg et al. | 128/898 |
| 7,020,647 B1 * | 3/2006 | Egan et al. | 707/2 |
| 7,107,206 B1 | 9/2006 | Uchida et al. | |
| 2002/0022953 A1 | 2/2002 | Bertolus et al. | |
| 2002/0165707 A1 | 11/2002 | Call | |
| 2003/0163595 A1 * | 8/2003 | Ta et al. | 709/313 |
| 2004/0230908 A1 * | 11/2004 | Atkin et al. | 715/535 |
| 2005/0080612 A1 | 4/2005 | Chai et al. | |
| 2005/0251383 A1 | 11/2005 | Murray | |

FOREIGN PATENT DOCUMENTS

| | | |
|---|---|---|
| EP | 0 457 706 | 11/1991 |
| JP | 7-182368 | 7/1995 |
| JP | 8-194719 | 7/1996 |
| WO | WO95/00896 | 1/1995 |
| WO | WO95/30981 | 11/1995 |
| WO | WO99/38093 | 7/1999 |
| WO | WO 01/06414 | 1/2001 |

OTHER PUBLICATIONS

Standish, T.A., "Data Structure Techniques", 1980, XP002217997, p. 290.

Mitschang et al., "SQL/XNF—Processing Composite Objects as Abstractions Over Relational Data", *Proceedings of the International Conference on Data Engineering*, IEEE, Apr. 19-23, 1993, pp. 272-282.

Barsalou et al., "Complex Objects for Relational Databases", *Computer-Aided Design*, vol. 22, No. 8, Oct. 1990, pp. 458-468.

Singhal et al., "A Data Model and Architecture for VLSI/CAD Databases", *International Conference on Computer-Aided Design*, Nov. 5, 1989, pp. 276-279.

Desai, "Performance of a Composite Attribute and Join Index", *IEEE Transactions on Software Engineering*, vol. 15, No. 2, Feb. 1989, pp. 142-152.

Blakeley et al., "Join Index, Materialized View, and Hybrid-Hash Join: A Performance Analysis", *Proceedings of the International Conference on Data Engineering*, Feb. 5, 1990, pp. 256-263.

Pucheral et al., "Efficient Main Memory Data Management Using the DBGraph Storage Model", *Proceedings of the International Conference on Very Large Data Bases*, Aug. 13, 1990, pp. 683-695.

Missikoff et al., "Relational Queries in a Domain Based DBMS", *ACM Proceedings of SIGMOD, International Conference on Management of Data*, May 23, 1983, pp. 219-227.

Cormen et al., "Introduction to Algorithms", copyright 1990 by The Massachusetts Institute of Technology, Nineteenth printing, 1997 by MIT Press, pp. 153-155.

Cormen et al., "Introduction to Algorithms", copyright 1990 by The Massachusetts Institute of Technology, Nineteenth printing, 1997 by MIT Press, pp. 1-5 and 11-15.

* cited by examiner

SYSTEM AND METHOD FOR ORGANIZING DATA

CROSS-REFERENCE TO RELATED APPLICATIONS

This application is a continuation application of application Ser. No. 09/357,301, filed on Jul. 20, 1999 now U.S. Pat. No. 6,424,969, the entire content of which is hereby incorporated by reference.

BACKGROUND

1. Field of the Invention

The present invention relates to database systems and more particularly, to a system and method for organizing data in a database system.

2. Discussion of the Related Art

Computerized database systems have long been used and their basic concepts are well known. A good introduction to database systems may be found in C. J. DATE, INTRODUCTION To DATABASE SYSTEMS (Addison Wesley, 6th ed. 1994).

In general, database systems are designed to organize, store and retrieve data in such a way that the data in the database is useful. For example, the data, or subsets of the data, may be searched, sorted, organized and/or combined with other data. To a large extent, the usefulness of a particular database system, is dependent on the integrity (i.e., the accuracy and/or correctness) of the data in the database system. Data integrity is affected by the degree of "disorder" in the data stored. Disorder may occur in the form of erroneous or incomplete data such as duplicate data, fragmented data, false data, etc. In many database systems, from time to time, existing data may be edited and processed, and as a result, additional errors may be introduced. In some database systems, new data may be introduced. Additionally, as database systems are upgraded with new hardware and/or software, data conversion may be required or additional fields may become necessary. Furthermore, in some applications, the data in the database may simply become outdated over time.

Regardless of the preventative steps taken, some degree of disorder is eventually introduced in conventional database systems. This degree of disorder increases exponentially over time until eventually, the data in a conventional database becomes entirely useless. As a result, even a small degree of disorder eventually affects the integrity of the database system.

Unfortunately, identifying and correcting disorder in the data are often difficult, if not impossible, tasks particularly in large database systems. Traditionally, such tasks are performed manually, making these tasks time-consuming, expensive, and subject to human error. Furthermore, due to the very nature of the task, much of the disorder may go largely undetected. What is needed is a system and method for organizing data in a database system to overcome these and other associated problems.

SUMMARY OF THE INVENTION

The present invention provides a system and method for organizing data in a database system. The present invention derives a distilled database of accurate data from raw data included in one or more raw data sources. The raw data is converted from its original format(s) to a numeric format. According to one embodiment of the present invention, the raw data is represented as a vector having numeric elements. Once the raw data is represented numerically, various mathematical operations such as correlation functions, pattern recognition methods, or other similar numeric methods, may be performed on these vectors to determine how content in a particular vector corresponds to others vectors in a "distilled" or reference database. The distilled database is formed from sets of one or more related vectors that are believed to be unique (e.g., orthogonal) with respect to the other sets. These sets represent the best information available from the raw data. After all the raw data has been incorporated into the distilled database, new data may be screened to ensure that new errors are not introduced into the distilled database. The new data may be also evaluated to determine whether it is unique or whether it includes better information than that already present in the distilled database. The new data is added to the distilled database accordingly.

One of the features of the present invention is that raw data is converted into a numeric format based on a number system having an appropriate radix. An appropriate radix is determined according to the type of information included in the raw data. For example, for raw data generally comprised of alpha-numeric characters, an appropriate radix may be greater than or equal to the number of different alpha-numeric characters present in the raw data. Using such a number system allows raw data to be represented numerically, allowing for manipulation through various well-known mathematical operations.

Another feature of the present invention is that the number system may be selected so that the numbers themselves retain semantic significance to the raw data they represent. In other words, the numerals in the number system are selected so that they correspond to the raw data. For example, in the case of raw data comprised of alphanumeric characters, the numerals are selected to correspond to the alphanumeric characters they represent. When the numerals in the number system are subsequently displayed, they appear as the alphanumeric characters they represent.

Another feature of the present invention is that once the raw data is represented as vectors in an appropriate number system, the represented data may be efficiently manipulated in the database (e.g., sorted, etc.) using various well-known techniques. Furthermore, various well-known mathematical operations may be performed on the vectors to analyze the data content. These mathematical operations may include correlation functions, eigenvector analyses, pattern recognition methods, and others as would be apparent.

Still another feature of the present invention is that the raw data is incorporated into a distilled database. The distilled database represents the best information extracted from the raw data without having any data disorder.

Yet another feature of the present invention is that new data may be compared to the distilled database to determine whether the new data actually includes any new information or content not already present in the distilled database. Any new information not already in the distilled database is added to the distilled database without adding any disorder. In this manner, the integrity of the distilled database may be maintained.

Other features and advantages of the invention will become apparent from the following drawings and description.

BRIEF DESCRIPTION OF THE DRAWINGS

The present invention is described with reference to the accompanying drawings. In the drawings, like reference numbers indicate identical or functionally similar elements.

Additionally, the left-most digit(s) of a reference number identifies the drawing in which the reference number first appears.

DETAILED DESCRIPTION OF THE PREFERRED EMBODIMENTS

Figure 1:
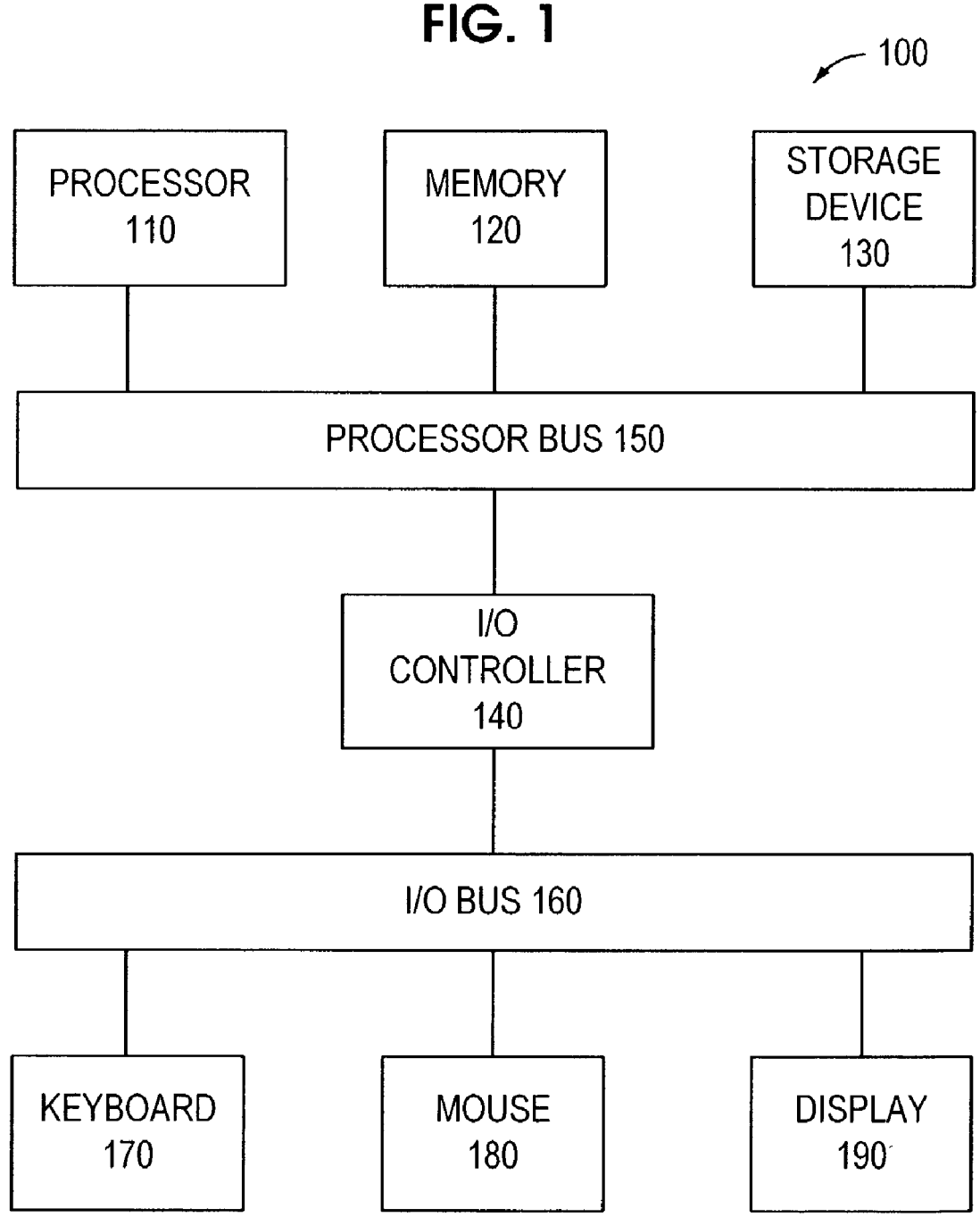
FIG. 1 illustrates a processing system in which the present invention may be implemented.

The present invention is directed to a system and method for organizing data in a database system. The present invention is described below with respect to various exemplary embodiments, particularly with respect to various database applications. However, various features of the present invention may be extended to other areas as would be apparent. In general, the present invention may be applicable to many database applications where large amounts of seemingly unrelated data must be compiled, stored, manipulated, and/or analyzed to determine the various relationships present in the content represented by the data. More particularly, the present invention provides a method for achieving and maintaining the integrity (i.e., accuracy and correctness) of data in a database system, even when that data initially possesses a high degree of disorder. As used herein, disorder refers to data that is duplicative, erroneous, incomplete, imprecise, false or otherwise incorrect or redundant. Disorder may present itself in the database system in many ways as would be apparent.

One embodiment of the present invention is used to maintain a database associated with accounts receivable. In this embodiment, a company may collect data relating to various persons, businesses and/or accounts from one or more sources. These sources may include, for example, credit card companies, financial institutions, banks, retail, and wholesale businesses and other such sources. While each of these sources may provide data relating to various accounts, each source may provide data representing different information based on its own needs. Furthermore, this data may be organized in entirely different ways. For example, a wholesale distributor may have data corresponding to accounts receivable corresponding to business accounts. Such data may be organized by account numbers, with each data record having data fields identifying an account number, a business associated with that account number, an address of that business, and an amount owed on the account. A retail company may have data records representing similar information but based on accounts corresponding to individuals as well as businesses.

In other embodiments of the present invention, other types of sources may provide different types of data. For example, the scientific institutions may provide scientific data with respect to various areas of research. Industrial companies may provide industrial data with respect to raw materials, manufacturing, production, and/or supply. Courts or other types of legal institutions may provide legal data with respect to legal status, judgments, bankruptcy, and/or liens. As would be apparent, the present invention may use data from a wide variety of sources.

In another embodiment of the present invention, a database may be maintained to implement an integrated billing and order control system. In addition to billing-type information from sources similar to those described above, this embodiment may include data records corresponding to inventory, data records corresponding to suppliers of the inventory, and data records corresponding to purchasers of the inventory. Inventory data may be organized by part numbers, with each data record having data fields identifying an internal part number, an external part number (i.e., supplier part number), a quantity on hand, a quantity expected to ship, a quantity expected to be received, a wholesale price, and a retail price. Supplier data may be organized by a supplier number; and customer data may be organized by a customer number. Data records corresponding to each of these records may include data fields identifying a part number, a part price, a quantity ordered, a ship data, and other such information.

Another embodiment of the present invention may include an enterprise storage system that consolidates corporate information from multiple, dissimilar sources and makes that information available to users on the corporate network regardless of the type of the data, the type of computer that generated the data, or the type of computer that requested the data. Still another embodiment of the present invention includes a business intelligence system that warehouses and markets information and allows that information to be processed and analyzed on-line.

The present invention enables raw data collected from different sources to be analyzed and distilled into a collection of accurate data, organized in a way that is useful for a particular application. Using the above example of an integrated billing and order control system, explained more fully below, the present invention may produce a distilled database in which related data, such as data relating to a particular supplier or customer, may be identified as such. In this example, duplicate data corresponding to the same supplier or customer may be identified and/or discarded, and erroneous data associated with the supplier or customer may be identified, analyzed, and possibly corrected.

In general, the present invention may be implemented in hardware or software, or a combination of both. Preferably, the present invention is implemented as a software program executing in a programmable processing system including a processor, a data storage system, and input and output devices. An example of such a system 100 is illustrated in FIG. 1. System 100 may include a processor 110, a memory 120, a storage device 130, and an I/O controller 140, coupled to one another by a processor bus 150. I/O controller 140 is also coupled via an I/O bus 160 to various input and output devices, such as a keyboard 170, a mouse 180, and a display 190. Other components may be included in the system 100 as would be apparent.

Figure 2:
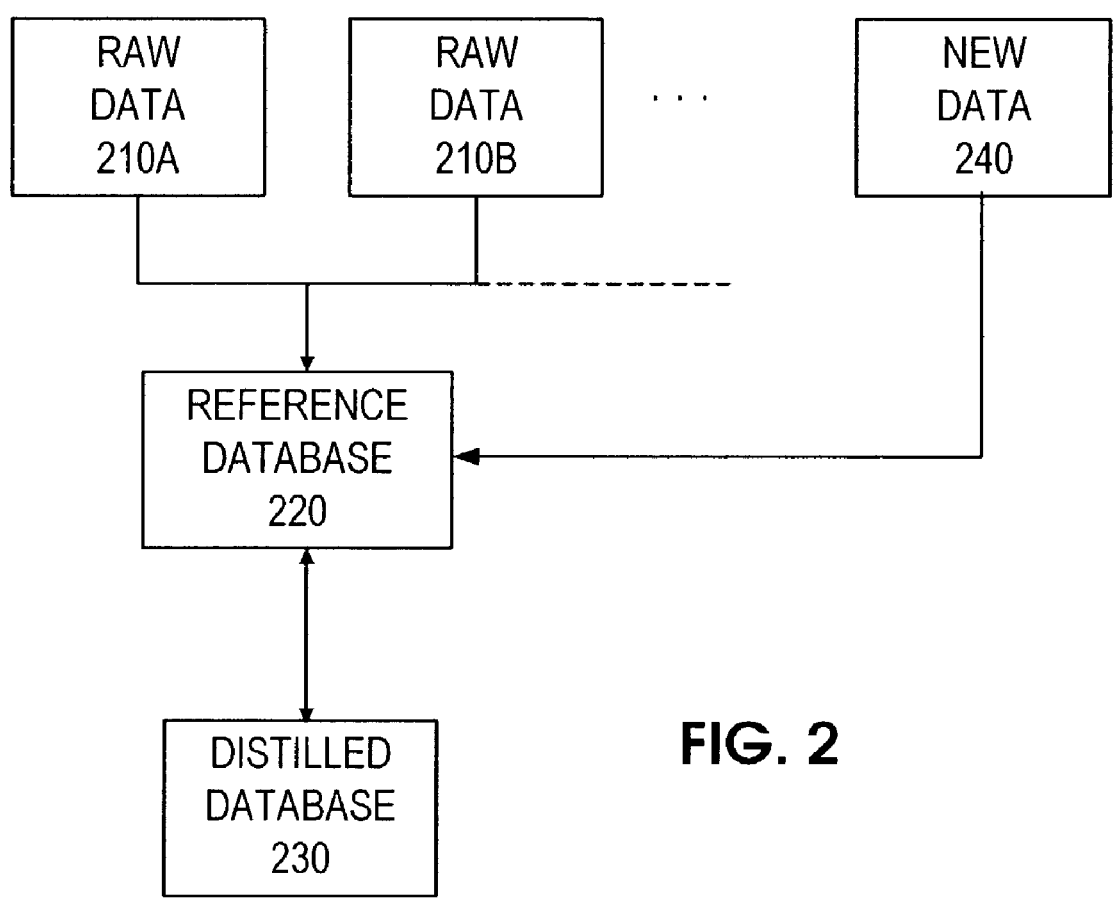
FIG. 2 illustrates stages of data processed by one embodiment of the present invention.

FIG. 2 illustrates various forms of data processed by the present invention. Raw data 210 may be collected from one or more sources, such as raw data 210A and raw data 210B. As used herein, "raw data" simply refers to data as it is received from a particular source. Additional sources of raw data 210 may be included as would be apparent. As explained below, raw data 210 from various sources is converted into a numerical format and stored in a reference database 220. Using a process referred to herein as "data dialysis," the present invention "purifies" raw data 210 to form reference data in reference database 220. Reference database 220 includes all the information found in raw data 210 including duplicate, incomplete, inconsistent, and erroneous data.

Distilled data stored in a distilled database 230 is derived from the reference data of reference database 220. Distilled data represents the "accurate" data available from raw data 210. Distilled database 230 includes the unique information found in raw data 210. Distilled data thus represents the best information available from raw data 210.

As also explained below, the present invention further provides for using distilled database 230 to analyze and verify new data 240, which may also be used to update the reference database 220 and distilled database 230 as appropriate.

While the present invention has numerous embodiments, to clarify its description, a preferred embodiment is explained with reference to FIGS. 3-8 in a context of an integrated billing and order control system. In this embodiment, raw data 210 is a collection of data collected from various sources, such as order processing, shipping, receiving, accounts payable and accounts receivable, etc. This raw data 210 may include data records that are related but have different data fields, duplicate data records, data records having one or more erroneous data fields, etc. To address such errors, the present invention converts raw data 210 from their original formats and data structures (which may vary based on the source) into a numeric format and stores this reference data in reference database 220.

According to the present invention, the reference data is then compared and analyzed to distill the best information available. In one embodiment of the present invention, this best information may be stored as distilled data in distilled database 230. This process is now described.

Collecting Raw Data

Figure 3:
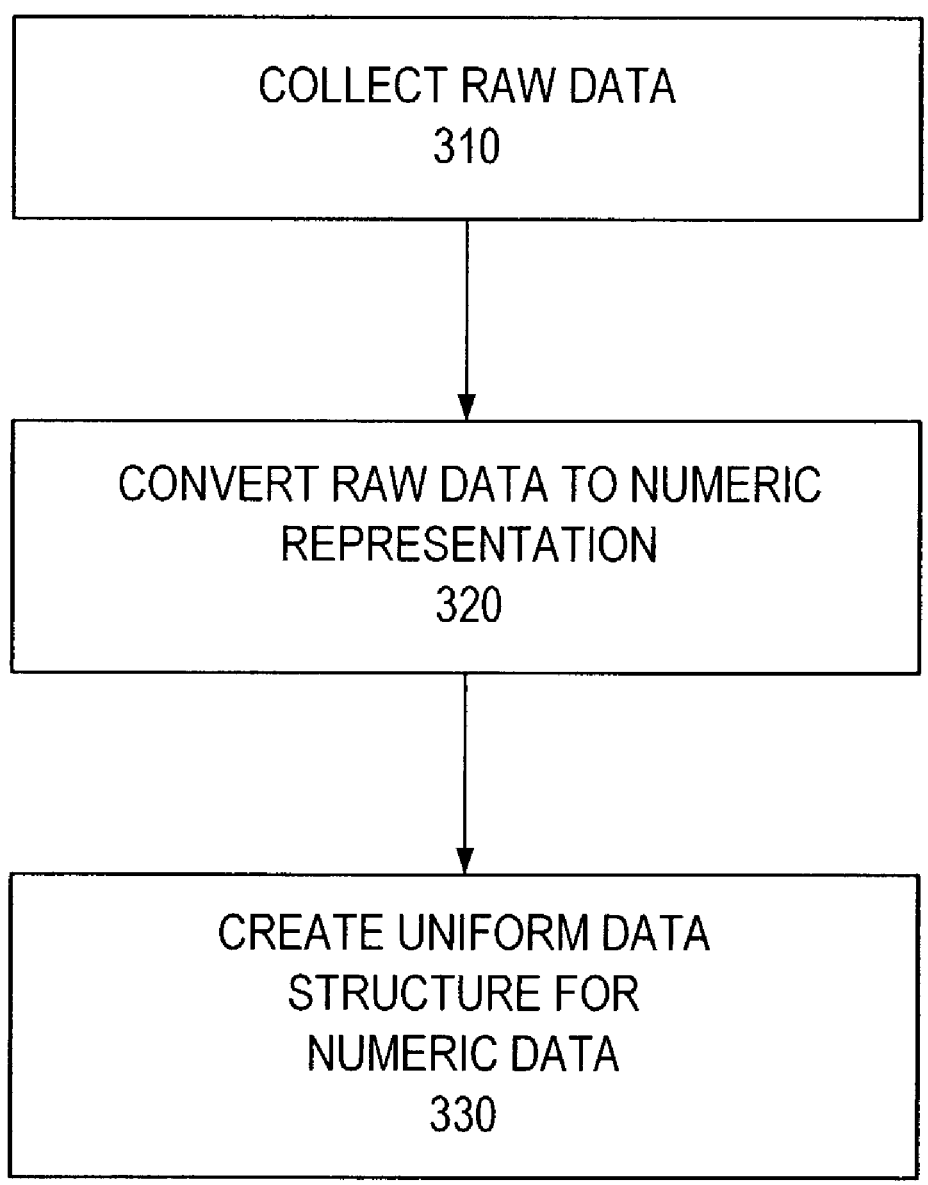
FIG. 3 is a flow diagram for converting raw data from its original format into a numeric format in accordance with one embodiment of the present invention.

FIG. 3 illustrates the process by which raw data 210 is converted into reference data in reference database 220 according to one embodiment of the present invention. In a step 310, raw data 210 is collected from a raw data source. As illustrated in FIG. 2, raw data 210 may include data from one or more sources such as raw data 210A and raw 210B. As used herein, "data" refers to the physical digital representation of information, and data "content" refers to the meaning of, or information included in or represented by that data. The different records in raw data 210 may include similar types of data content. For example, in a billing context, different records in raw data 210 may all include data content relating to a particular account.

Figure 4:
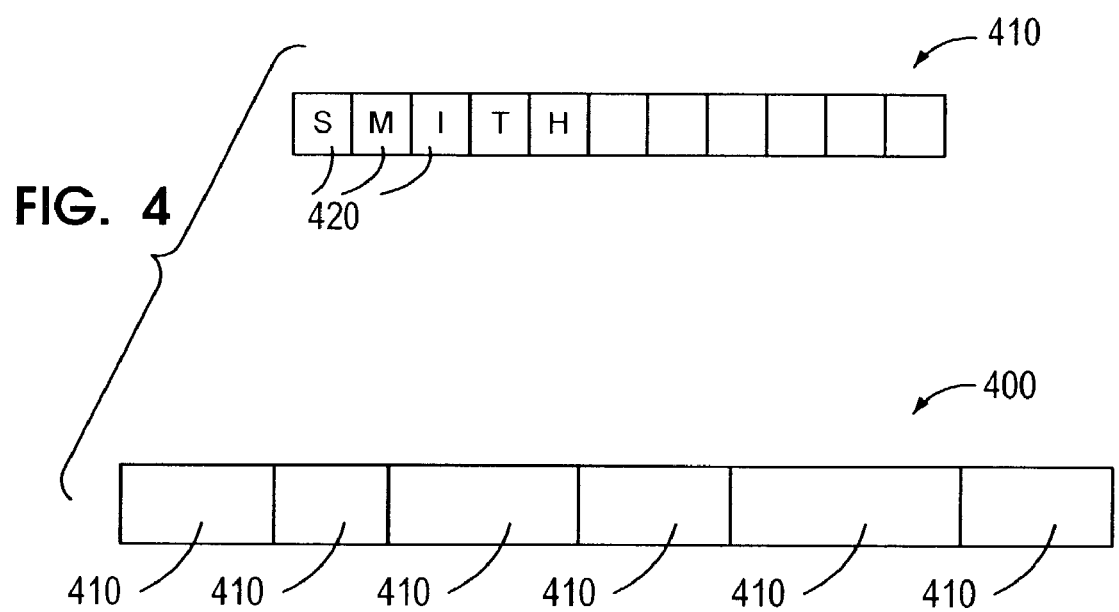
FIG. 4 illustrates a data record suitable for use with the present invention.

Raw data 210 will typically be received in the form of data records 400, as illustrated in FIG. 4. Each data record 400 generally includes related information, such as information for a specific individual, company, or account. Each data record 400 stores this information in one or more data fields 410. Examples of possible data fields 410 include, for example, an account number, a last name, a first name, a company name, an account balance, etc. Each data field 410, in turn, may include one or more data elements 420 for representing information for that specific record and specific field. Data elements 420 may exist in various formats, such as alphanumeric, numeric, ASCII, and EBCDIC, or other representation as would be apparent. Raw data 210 collected from different sources may be formatted differently. Data records 400 may include different data fields 410, and the information included in data fields 410 may be represented using data elements 420 in different formats, as would also be apparent.

Figure 5:
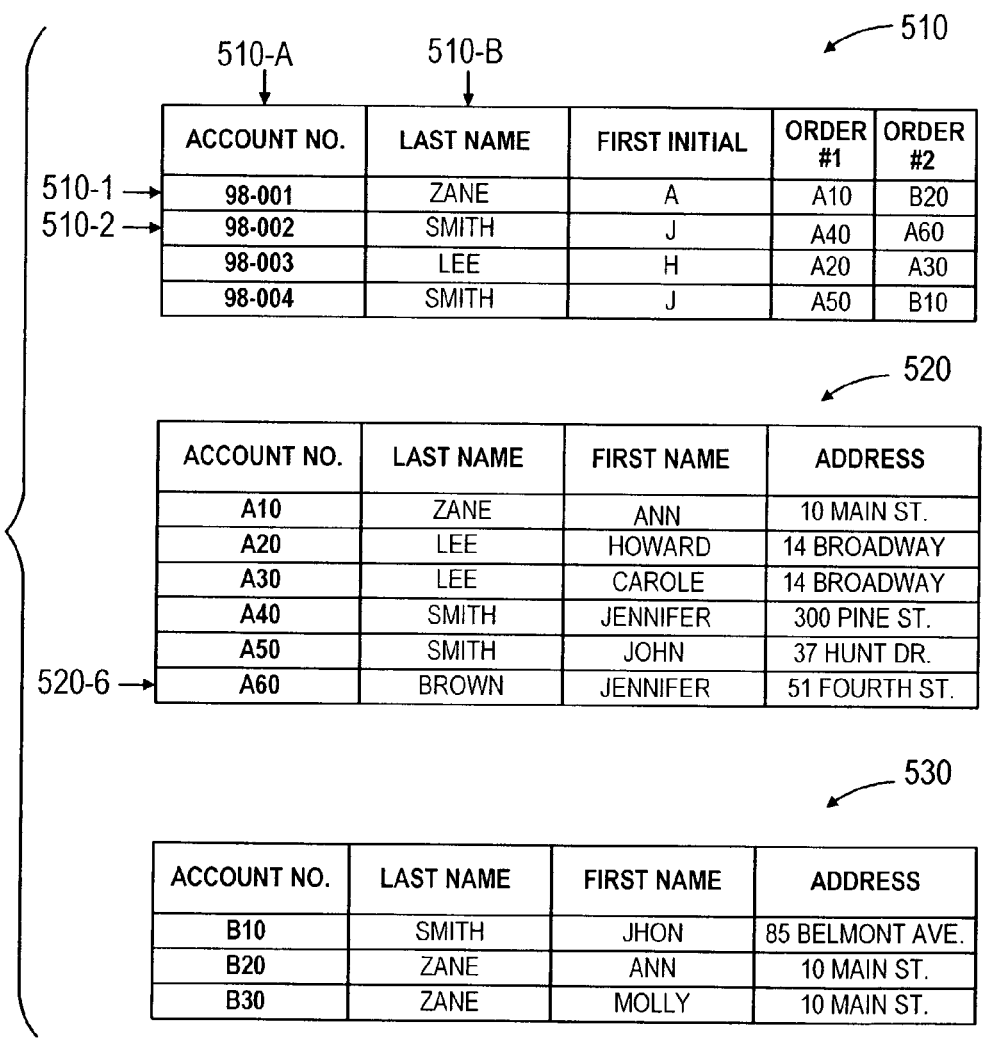
FIG. 5 illustrates raw data tables suitable for use with the present invention.

Examples of raw data 210 are illustrated in raw data tables 510, 520, and 530 of FIG. 5. Data records, such as data record 510-1 and data record 510-2, are illustrated as rows of raw data tables 510, 520, and 530, whereas data fields, such as data field 510-A and data field 510-B, are illustrated as columns of raw data tables 510, 520, and 530. The tables illustrated in FIG. 5 are examples of data that might be found in various embodiments of the present invention. In other embodiments, data may come from many sources and may be formatted as databases having a much larger number of data records and/or data fields, as would be apparent.

Conversion to Numeric Format

Referring to FIG. 3, in a step 320, the present invention converts raw data 210 from its original representation (which may be in alphanumeric, numeric, ASCII, EBCDIC, or other similar formats) to a numeric representation. This ensures that reference data is represented in the same manner. Thus, the reference data, including that data from different sources, may be similarly processed.

According to the present invention, raw data 210 is converted from its original representation into an appropriate numeric representation. An appropriate numeric representation uses a number system in which each possible value of data element 420 may be represented by a unique digit or value in the number system. In other words, a radix for the number system is selected such that the radix is at least as great as the number of possible values for a particular data element. For example, in a biotechnology application for detecting nucleotide sequences of Adenine (A), Guanine (G), Cytosine (C), and Thymine (T) in nucleic acids, each data element may be one of only four values: A, G, C, and T. In such an application, a radix of four for the number system may be sufficient to represent each data element as a unique number. One such number system may include the numbers A, G, C, and T. In some embodiments of the present invention, it may be desirable to use a radix at least one greater than the number of different possible value of data element 420 in order to provide a number representative of an empty field. In this case, such as number system may include the numbers A, G, C, T, and ˆ, where ˆ is the empty field value.

According to a preferred embodiment of the present invention, data elements 420 in raw data 210 are comprised of characters such as alphanumeric characters. In this preferred embodiment, a radix of 40 is selected to represent the alphanumeric characters as illustrated in the table below. (Note that a minimum radix of 36 is required.) This radix is selected to accommodate the ten numeric characters "0"-"9" and the twenty-six alphabetic characters "A" to "Z" as well as to allow for several additional characters. In this embodiment, uppercase and lowercase characters are not distinguished from one another.

As illustrated in Table 1, the base-40 number system includes the numbers 0-9, followed by A-Z, further followed by four additional numbers. One of these numbers may used to represent an empty field. This number is used to represent a data field 410 that is empty or has no value (in contrast to a zero value). Other numbers may be used, for example, to represent other types of information such as spaces or used as control information.

TABLE 1

| Alpha-Numeric | Base-10 Number | Base-40 Number | Alpha-Numeric | Base 10 Number | Base-40 Number |
| --- | --- | --- | --- | --- | --- |
| 0 | 0 | 0 | K or k | 20 | K |
| 1 | 1 | 1 | L or l | 21 | L |
| 2 | 2 | 2 | M or m | 22 | M |
| 3 | 3 | 3 | N or n | 23 | N |
| 4 | 4 | 4 | O or o | 24 | O |

TABLE 1-continued

| Alpha-Numeric | Base-10 Number | Base-40 Number | Alpha-Numeric | Base 10 Number | Base-40 Number |
|---|---|---|---|---|---|
| 5 | 5 | 5 | P or p | 25 | P |
| 6 | 6 | 6 | Q or q | 26 | Q |
| 7 | 7 | 7 | R or r | 27 | R |
| 8 | 8 | 8 | S or s | 28 | S |
| 9 | 9 | 9 | T or t | 29 | T |
| A or a | 10 | A | U or u | 30 | U |
| B or b | 11 | B | V or v | 31 | V |
| C or c | 12 | C | W or w | 32 | W |
| D or d | 13 | D | X or x | 33 | X |
| E or e | 14 | E | Y or y | 34 | Y |
| F or f | 15 | F | Z or z | 35 | Z |
| G or g | 16 | G | — | 36 | [ |
| H or h | 17 | H | — | 37 | \ |
| I or i | 18 | I | — | 38 | ] |
| J or j | 19 | J | — | 39 | ^ |

Representation of raw data 210 in a base-40 format has numerous benefits. One benefit is that raw data 210 may be represented in a numeric fashion, facilitating straightforward mathematical manipulation. Another benefit is that proper selection of both the radix and the numerals in the number system allows the represented content to maintain semantic significance, facilitating recognition the content of raw data 210 in its representation in the numeric format. For example, the word "JOHN" represented by the four alphanumeric characters "J" "O" "H" "N" may be represented in various number systems. One such number system is a base-40 number system. Using Table 1, representing the alphanumeric characters "JOHN" as a base-40 number would result in the "tetradecimal" value 'JOHN', which is equivalent to the decimal value 1,255,103 ($19*40^3+24*40^2+17*40^1+23*40^0$, where base-40 'I' equals decimal 19, etc.). Note that the base-10 number loses semantic significance from the content of raw data 210 whereas the base-40 number retains semantic significance, as the number 'JOHN' is recognizable as the content "JOHN." Semantic significance provides the benefits of a numeric representation while maintaining the ability to convey semantic content.

In some embodiments of the present invention, the selection of a radix and its corresponding number system may depend upon the number of bits used by processor 110. The number of bits used by processor 110 and the radix chosen for the number system define the number characters that can be represented by a data word in processor 110. This relationship is governed according to the following equation:

$$N = B*\ln(2)/\ln(R),$$

where N is the number of whole characters (i.e., fractional characters are discarded) represented by a data word of processor 110, B is the number of bits per data word, and R is the selected radix. This relationship limits the number of data elements 420 of raw data 210 that may fit in a data word. For example, in a 32-bit machine, the maximum number of characters that may fit in a data word using a base-40 number system is six ($32*\ln(2)/\ln(40)$ =6.013). The maximum number of characters that may fit in a data word using a base-41 number system is only five ($32*\ln(2)/\ln(41)=5.973$). Thus, in some embodiments of the present invention, in addition to having a radix sufficiently large to maintain semantic significance, the radix may also be selected to maximize the number of characters represented by a single data word. In the embodiment with raw data comprised of alphanumeric characters, an appropriate radix may range from 36 to 40. This range maintains semantic significance while maximizing the number of characters represented by the 32-bit data word. Other types of raw data and other sizes of data word may dictate other appropriate radix ranges in other embodiments of the present invention.

The embodiment of the present invention described above does not distinguish between uppercase and lowercase characters. However, other embodiments of the present invention may distinguish between these types of characters. Accordingly, a base-64 representation ("0"-"9", "A"-"Z", "a"-"z", and two other values) may be appropriate to distinguish between these characters as would be apparent.

The number of data elements 420 in each data field 410 also dictates the precision required by the number as represented in processor 110. As described above, each data field 410 may only be six characters or data elements 420 wide for single precision operations in a 32-bit machine. In some embodiments of the present invention, this may be insufficient. In these embodiments, double, triple, or even quadruple precision may be required to represent the entire data field 410 as a single value. Double precision numbers are sufficient for up to twelve character data fields 410; triple precision numbers are sufficient for up to eighteen characters; and quadruple precision numbers are sufficient for up to twenty-four characters.

Alternate embodiments of the present invention may accommodate large data fields by breaking a large data field into one or more smaller data fields. The large data fields may be broken at boundaries defined by spaces. For example, a data field representing an address such as "123 West Main Street" may be broken into four smaller data fields: '123', 'West', 'Main', and 'Street'. The large data fields may also be broken at data word boundaries. In the address example above, the smaller data fields might be: '123We', 'st\Mai', 'n\Stre', and 'et', where the number '\' is used to represent a space. Other embodiments of the present invention may accommodate large data fields in other manners as would be apparent.

Data Structure Conversion

As illustrated in FIG. 3, in a step 330, raw data 210 represented as a number is stored in a predefined data structure. In one embodiment of the present invention, this data structure is a single-field table as illustrated by Tables 610-670 of FIG. 6. This data structure may vary. For example, in other embodiments of the present invention, the data structure may be a multiple-field table instead of a single-field table. In these embodiments, the data structures may be implemented with standard features such as table headers and indices, and as explained in greater detail below, may also include probability values for each record. These probability values represent the likelihood that the data in that record is complete. Higher probability values may indicate a higher probability of completeness, and lower probability values similarly may indicate a lower probability of completeness. This is described in further detail below. Initially, the probability values are set to 0. Other embodiments may also include key numbers or identification numbers to aid in sorting and in maintaining relationships among the data records.

In a preferred embodiment of the present invention, raw data 210 illustrated in FIG. 5 includes three tables 510, 520, and 530. Table 510 may represent raw data 210 from, for example, a company's accounts receivable system. Columns of table 510 represent data fields for an account number, a last name, a first initial, and additional fields for listing various orders processed for a particular individual. Rows of table 510 (such as 510-1 and 510-2) represent data records for different individuals. Tables 520 and 530 may represent raw data 210 maintained by credit card companies. Columns of tables 520 and 530 represent data fields for an account number, a last name, a first name, and an address. Rows of tables 520 and 530 represent data records for specific accounts.

Figure 6:
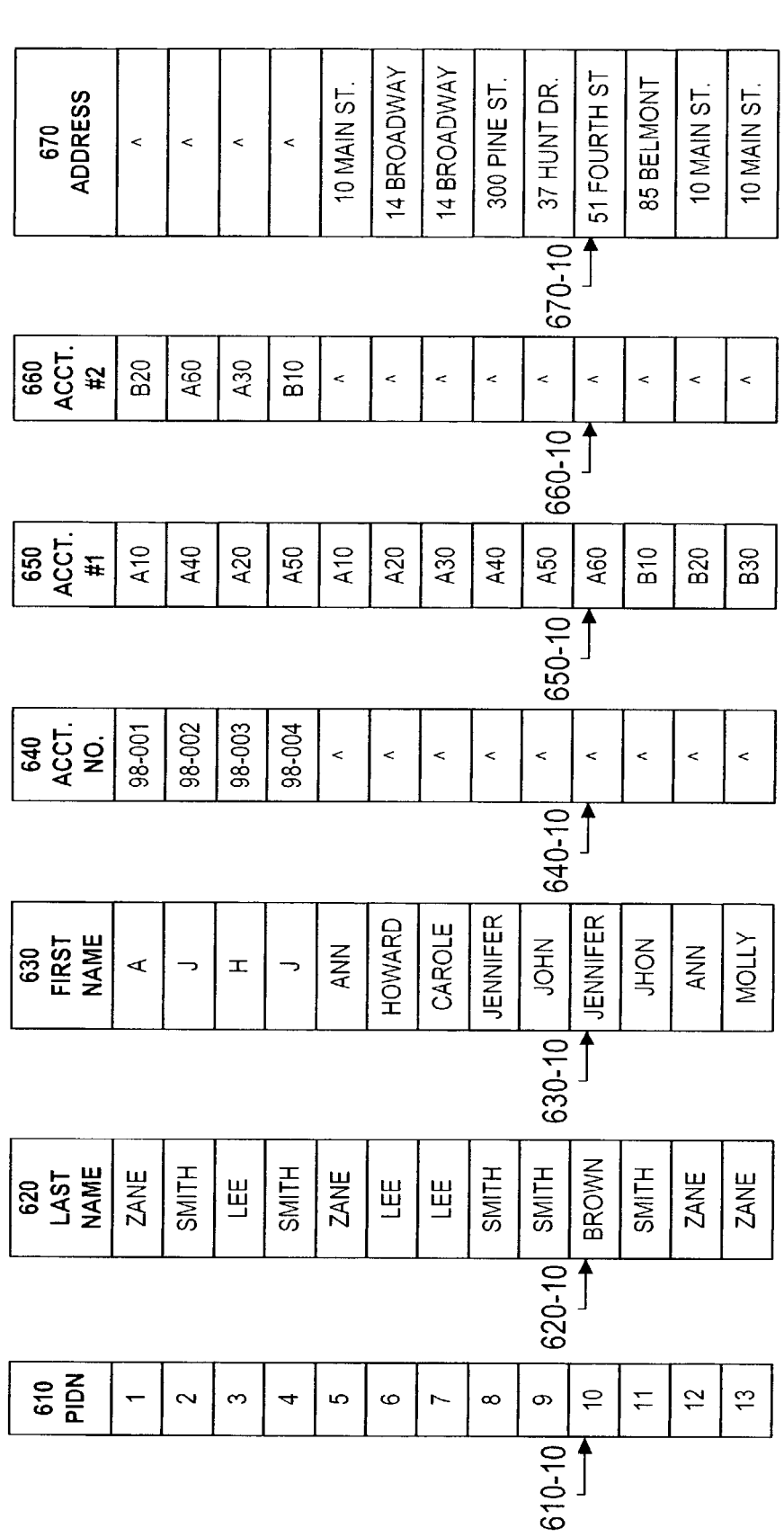
FIG. 6 illustrates reference data tables, representing data formatted in accordance with an embodiment of the present invention.
Figure 7:
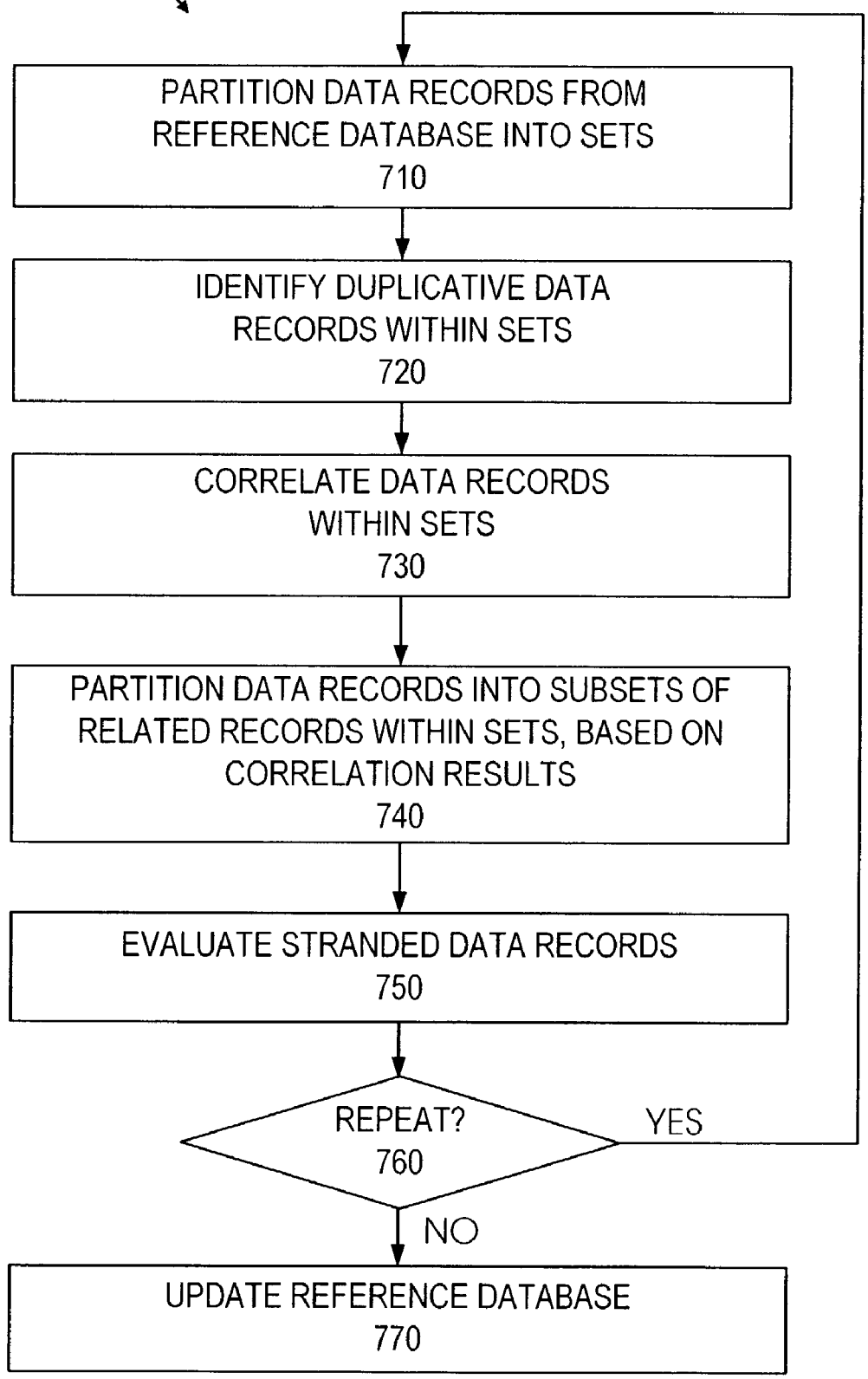
FIG. 7 is a flow diagram for analyzing reference data in accordance with an embodiment of the present invention.

In the preferred embodiment, step 330 converts raw data 210 from the format illustrated in FIG. 5 into a format illustrated in FIG. 6. FIG. 6 illustrates raw data 210, combined from the various raw data tables 510, 520, 530 of FIG. 5, represented as numbers in a base-40 number system, and formatted as new tables (tables 610-670), which together may comprise reference database 220.

Each reference database table 610-670 corresponds to an individual field from raw data tables 510, 520, and 530 of FIG. 5. More specifically, data records of reference data tables 610-670 correspond to the data records of raw data table 510, followed by the data records of raw data table 520, followed by the data records of raw data table 530. In one embodiment of the present invention, where a raw data table record has no information for a particular data field 410 represented in a reference table 610-670, a empty field value is entered in that field in the reference table. For example, the first data record 510-1 of Table 510 has no information about an address, and thus an empty field value is placed in the first position of table 670.

Data is preferably stored in reference database 220 in such a way that all data corresponding to a single data record in a raw data table is readily identified. In the embodiment represented in FIGS. 5 and 6, for example, data corresponding to any specific data record of the raw data tables (tables 510, 520, 530) is preferably represented in reference tables 610-670 as a "vector" of numeric data stored at an index i across reference tables 610-670. For example, data corresponding to the sixth record 520-6 of raw data table 520 (illustrated as account number "A60" belonging to "Jennifer Brown," residing at "51 Fourth Street") is represented in reference database tables 610-670 as a vector having coefficients formed from the tenth records 610-10, 620-10, 630-10, 640-10, 650-10, 660-10, and 670-10 of the tables 610-670.

As illustrated in FIG. 6, reference database 220 includes a new table 610 that does not correspond to any data field 410 in raw data 210 illustrated in FIG. 5. This table is a "key table" that identifies the related data in these data vectors. As described below, reference database 220 comprised of the tables illustrated in FIG. 6 may include additional key tables for data fields. These may include a personal identification number ("PIDN"), an account identification number ("AIDN"), or other types of identification numbers. These key tables or identification numbers may be used to identify sets of related data vectors in reference database 220.

In this example, key table 610 has a single field "PIDN," which stands for personal identification number. Key table 610 provides a unique identifier such that a specific PIDN number never refers to more than one person represented in raw data 210. In other words, the PIDN number reflects the fact that many multiple records in raw data 210 may refer to the same person.

Preferably, each data record in the key table 610 initially corresponds to a different data record represented in the raw data tables 510, 520, and 530. For example, in FIG. 6, data record 610-10 in the key table 610 is implemented such that it includes identifiers (such as pointers or indices) for corresponding data in reference tables 620-670, which together corresponds to a single record 520-6 in raw data table 520.

Initially, while a single PIDN does not refer to multiple individuals, a single individual may correspond to multiple PIDNs. For example, in FIG. 6, vector 4 (defined by PIDN 4) and vector 9 (defined by PIDN 9) appear to refer to the same person, but as illustrated, this person is initially assigned to two PIDN numbers—PIDN 4 and PIDN 9. As described below, the present invention enables a determination whether PIDN 4 and PIDN 9 do, in fact, refer to the same individual, and if so, assigns a single PIDN to this individual. Alternatively, some embodiments may assign a new PIDN number to individuals so determined and a reference to the old PIDN number may be retained.

As discussed above, in this embodiment, records are represented in the reference database tables 610-670 as vectors having coefficients of base-40 numbers across eight one-field tables. This numeric representation allows the data to be analyzed using straightforward mathematical operations that may be used to, for example, produce correlations, calculate eigenvectors, perform various coordinate transformations, and utilize various pattern recognition analyses. These operations may, in turn, be used to provide or derive information about the records and their relationships to one another. By using small, one-field tables, these operations may be performed quickly. In addition, as will be illustrated, representation in base-40 numbers with raw data 210 including alphanumeric characters allows content of raw data 210 to retain its semantic significance.

Data Dialysis

Referring back to FIG. 2, once reference database 220 is created as illustrated in FIG. 6, a data dialysis process 700 is applied to distill the most accurate data for inclusion in distilled database 230. Data dialysis 700 is now described with reference to FIG. 7.

Partitioning the Reference Data

In a step 710, reference database 220 is preferably partitioned or sorted into sets based on some criteria. These sorting criteria may vary. For example, as illustrated in table 810 of FIG. 8, in this embodiment, data records may be sorted into sets based on last name, with the values arranged in increasing numeric order (recall that content of raw data is now represented as base-40 numbers in reference database 220). Table 810 is derived from reference database table 620 illustrated in FIG. 6, with each entry of table 810 defined by a unique last name and having a corresponding set of table 620 records matching that last name. In the representation illustrated, table 810 includes a field for defining the set (in this case, a last name), as well as identifiers for members of the set (such as indices, pointers or other appropriated references—in this case PIDNs).

In some embodiments of the present invention, not all vectors in reference database 220 will have data for the field on which the sets are based. Such vectors may be handled in various manners. For example, all vectors in reference database 220 having no data for that data field may be regarded as members of a single, additional set. Alternatively, each vector in reference database 220 having no data for that data field may be regarded as the single member of its own set.

Identifying Duplicate Data

Returning to FIG. 7, in a step 720, those data records within the partitioned sets identified as duplicates are marked. In some embodiments of the present invention, duplicate data may be unnecessary and may be discarded. In other embodiments, all information remains in reference database 220 as all information, even erroneous, incomplete, or duplicate information may be better than no information and may be useful for some purpose, such as identifying fraud.

In some embodiments of the present invention, comparing a pair of vectors may identify duplicates. Various operations may be used, as would be apparent. In a simple example, a straightforward vector subtraction may be performed to measure the degree of similarity between two records. Other techniques may be used to identify duplicate vectors such as using "look-up" tables to identify common names, nicknames, abbreviations, etc.

Figure 8:
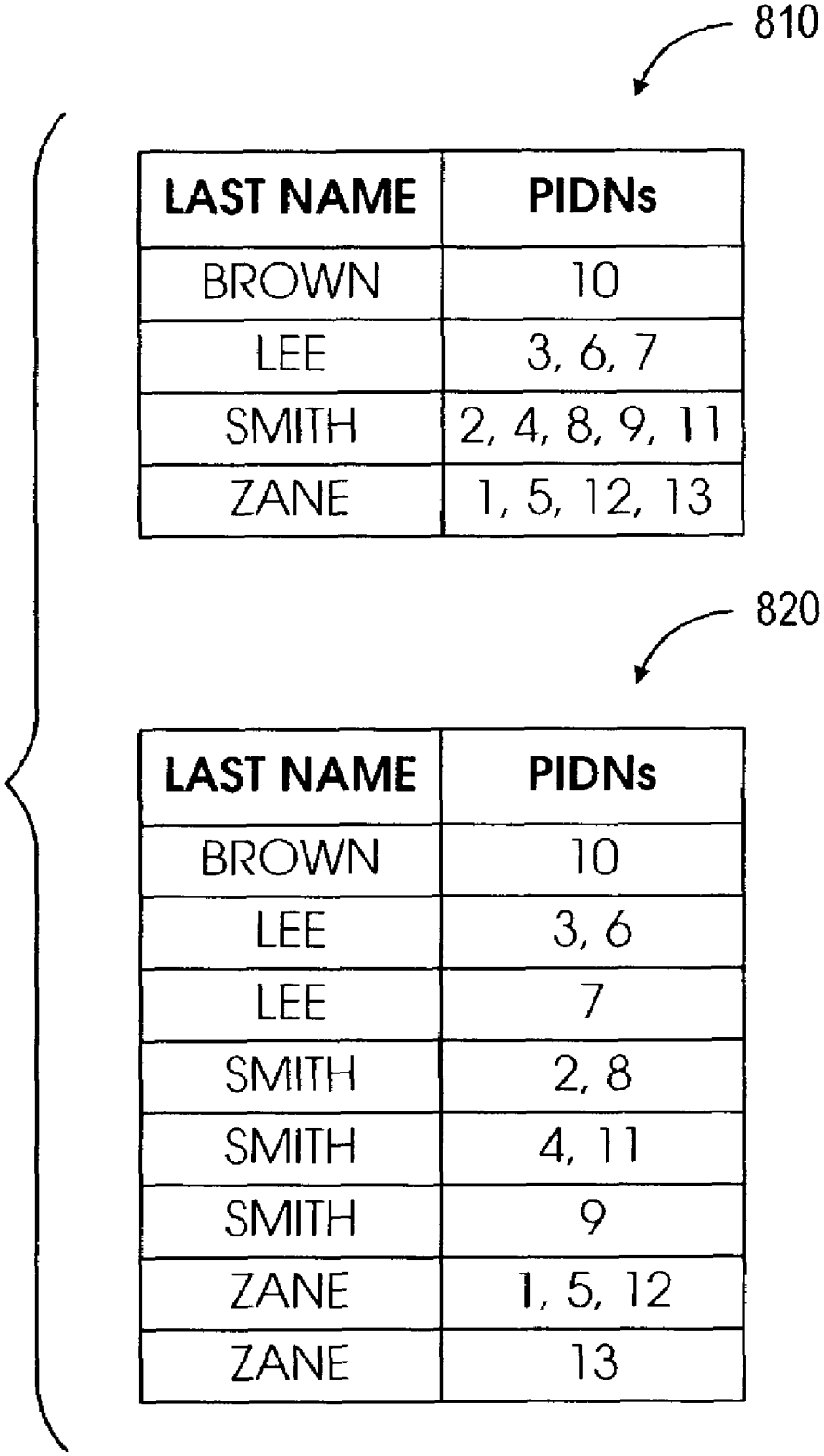
FIG. 8 illustrates distilled data table, representing related data correlated in accordance with an embodiment of the present invention.

Table 810 of FIG. 8 illustrates that the last name "Smith" corresponds to PIDNs 2, 4, 8, 9, and 11, representing vectors formed from entries 2, 4, 8, 9, and 11 of the reference database tables 610-670 illustrated in FIG. 6:

For PIDN 2: [SMITH, J , 98-002, A40, A60, ^]
For PIDN 4: [SMITH, J , 98-004, A50, B10, ^]
For PIDN 8: [SMITH, Jennifer, ^, A40, ^, 300 Pine St. ]
For PIDN 9: [SMITH, John, ^, A50, ^, 37 Hunt Dr.]
For PIDN 11: [SMITH, Jhon, ^, B10, ^, 85 Belmont Ave. ]

Vector (or matrix) operations comparing the vectors and thresholds for determining when two entries are similar enough to be regarded as duplicates may be defined as appropriate for various embodiments. In a simple example, the sum of the absolute differences between corresponding coefficients of a pair of vectors may indicate a similarity between the corresponding pair of records. This pair of vectors may be considered duplicates if a first vector is not inconsistent with any field of a second vector, and does not provide any additional data. In this embodiment, additional rules would also be defined, for example, for comparing entries of different lengths (e.g., right aligning character strings corresponding to numbers, and left aligning character strings corresponding to letters), for recognizing commonly misspelled or spelling variations of words, and for recognizing transposed letters in words. This processing may be performed by various mechanisms, as would be apparent. In the example of Table 810 of FIG. 8, none of the data records are exact duplicates, and so none are marked in step 720.

Correlating Data

Referring back to FIG. 7, in a step 730, the preferred embodiment of the present invention correlates data records remaining within each set and in a step 740, further partitions the data records into independent subsets of data records. In general, the "correlation" between two vectors is a measurement of how closely one is related to the other, and specific methods of correlation may vary depending on the intended application. A general discussion and examples of correlation functions may be found in references such as NUMERICAL RECIPES IN C: THE ART OF SCIENTIFIC COMPUTING (Cambridge University Press, 2nd ed. 1992) by William H. Press, et al. Other techniques and examples may be found in THE ART OF COMPUTER PROGRAMMING (Addison-Wesley Pub., 1998) by Donald E. Knuth.

As an example, a simple measurement of the correlation between vectors is their dot product, which may be weighted as appropriate. Depending on the application, the dot product may be calculated on only a subset of the vector coefficients, or may be defined to compare not only corresponding coefficients, but also other pairs of coefficients determined to be in related fields (i.e., comparing a "first name" coefficient of a first vector with a "middle name" coefficient of a second vector). As with the operations for identifying duplicate data, the correlation function may be appropriately tailored for its intended application. For example, a correlation function may be defined to appropriately compare entries of different lengths and to appropriately distinguish between significant and insignificant differences, as would be apparent.

In the embodiment explained with reference to the tables of FIGS. 5, 6, and 8, an example of a correlation function compares vectors corresponding to the members of a set sharing the same last name to identify independent subsets of vectors. Again, this determination may be based on application-specific criteria. In this example, independent vectors may be defined to be those vectors representing different individuals.

As a result of applying the correlation function, a correlation parameter reflecting the degree of independence of a pair of vectors is assigned. For example, a high value may be assigned to indicate a high degree of similarity, and a low value may be assigned to indicate a limited degree of similarity. The correlation value is then compared to a predetermined threshold value—which again, may vary in different applications—to determine whether the two records corresponding to those vectors are considered to be independent.

Based on the correlation values, in a step 740, the preferred embodiment partitions the data records into subsets of independent data records within each set. In the examples of FIG. 5, 6, and Table 810 of FIG. 8, members of an independent subset may be identified as those members having: the same last name (taking into consideration misspellings and spelling variations); relatively similar first names (taking into consideration misspellings, spelling variations, nicknames, and combinations of first and middle names and initials); having one or more matching account numbers; and having no more than three addresses (to allow for work and home addresses, and one change of address).

Results of applying such a function are illustrated in Table 820 of FIG. 8. The individuals identified are:
Jennifer Brown, PIDN 10;
Howard Lee, PIDNs 3 and 6;
Carole Lee, PIDN 7;
Jennifer Smith, PIDNs 2 and 8;
John Smith, PIDNs 4 and 11;
John Smith, PIDN 9;
Ann Zane, PIDNs 1, 5, and 12; and
Molly Zane, PIDN 13.

Other operations for correlating the vectors are available. These may include computing dot products, cross products, lengths, direction vectors, and a plethora of other functions and algorithms used for evaluation according to well-known techniques.

Figure 9:
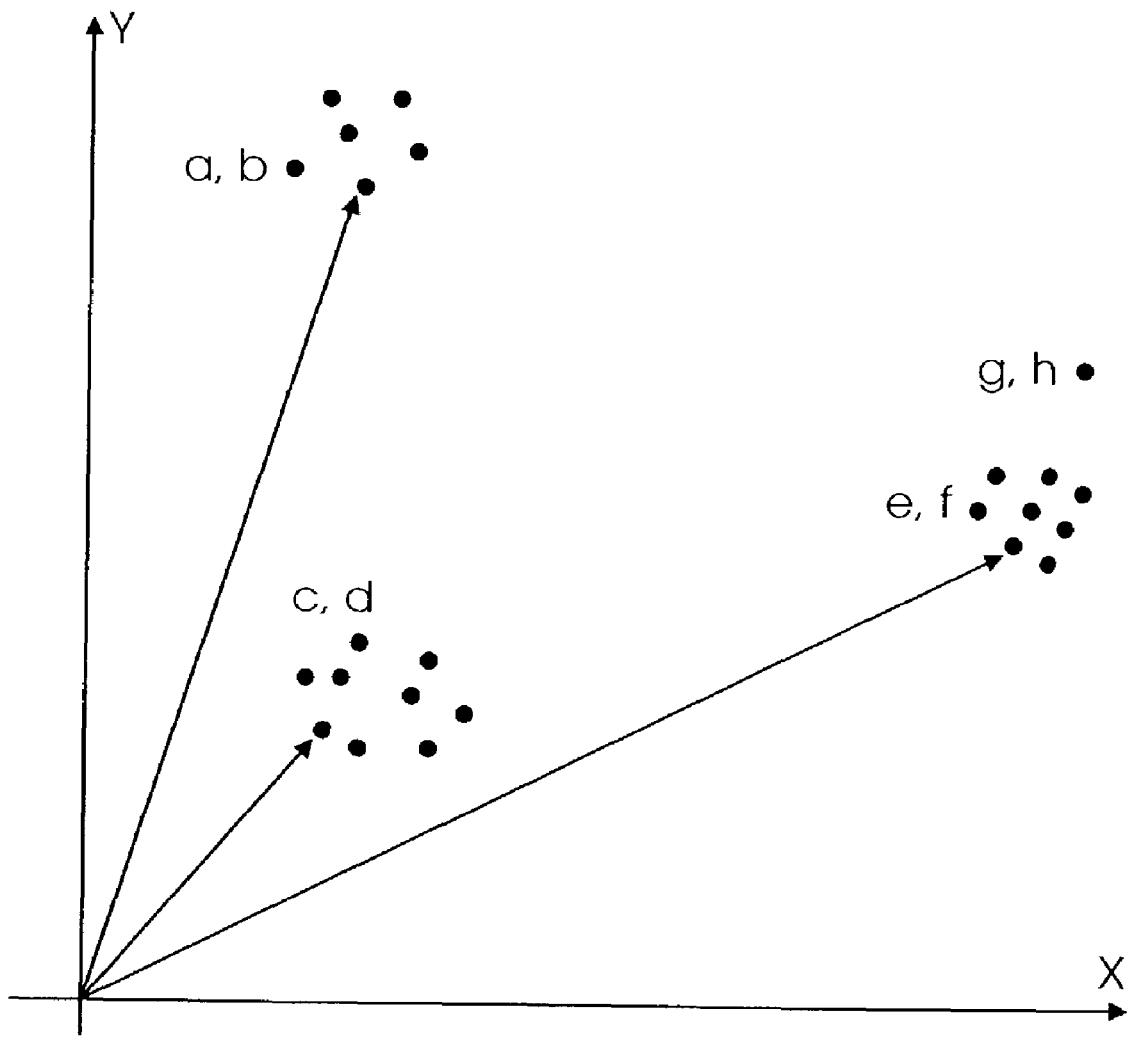
FIG. 9 illustrates an example of data clustering in a two-dimensional space.

FIG. 9 illustrates a two-dimensional example of a concept referred to as clustering which is used conceptually to describe some general aspects of the present invention. In FIG. 9, four clusters exist as a collection of two-dimensional points. These clusters are identified as: (a,b), (c,d), (e,f), and (g,h). As illustrated, each cluster is formed from one or more points in the two-dimensional space. Each point corresponds to a data record that represents (with more or less accuracy) the "true" value of the cluster in the space. As illustrated, clusters (a,b,) and (c,d) are fairly easy to distinguish from one another and from clusters (e,f) and (g,h). However, in this simple example, clusters (e,f) and (g,h) are not easily distinguished from one another. Extending the space (i.e., adding additional data fields to the vectors), may increase the separation between clusters such as (e,f) and (g,h) so that they become more readily distinguished from one another. Alternately, extending the space may indicate that (g,h) is a point that belongs to cluster (e,f) or even cluster (c,d). In the abstract, the space may be extended infinitely, resulting in a Hilbert space, which has various well-known characteristics. These characteristics may be exploited by the present invention for large, albeit not infinite, vectors as would be apparent.

Furthermore, while adding additional data fields to the vectors (i.e., extending the space) may separate clusters from one another to aid in their correlation, deleting data fields from the vectors (i.e., reducing the space) may also identify some correlations. In some embodiments of the present invention, reducing the space may identify certain clusters that are in fact representing the same individual or other unique entity. For example, one record in a database may have ten data fields exactly identical to the same ten data fields in a second record in the database. These data fields may correspond to a first name, a birth date, an address, a mother's maiden name, etc. However, these two records may have two fields that are different. These two fields may correspond to a last name and a social security number. In some cases, these records may correspond to the same individual. The present invention simplifies the process for identifying these types of records that would be difficult, if not impossible, to detect using conventional methods.

Thus, removing one or more particular data fields from a vector and reducing the corresponding space may reveal clusters that otherwise would not be apparent. Doing this for data fields traditionally used for identification purposes (e.g., last name, social security number, etc.) may reveal duplicate records in databases. This may be particularly useful for identifying fraud. Removing data fields where a vector includes an empty field value for that data field may also reveal clusters that would not otherwise be apparent.

Furthermore, once the clusters are identified as representing the same individual or entity, the best information for the individual or entity may be extracted from the information provided by each record or "black dot."

The principles of the present invention may be extended beyond simple vectors and data fields. For example, the present invention may be extended through the use of tensors representing objects in a multi-dimensional space. In this manner, the present invention may be used to represent the parameters of various physical phenomenon to gain additional insight into their operation and effect. Such application may be particularly useful for deciphering the human gene and aid in the efforts of programs such as the Human Genome Project.

Handling Stranded Data

Referring again to FIG. 7, in a step 750, the preferred embodiment of the present invention evaluates "stranded" data records. Stranded data records are those records from reference database 220 that were not partitioned into any set in step 710. In some embodiments, reference database 220 may include a large number of tables corresponding to data fields and a large number of vectors having data for various combinations of fields. For example, in an embodiment having a reference database 220 including 20 tables for different data fields and 1000 vectors defined by related data records for each table, suppose only 800 of those 1000 vectors have data for the field "last name," by which the sets were created in step 710. Step 710 may not partition those 200 vectors with no "last name" data into any set, or to partition each of those 200 vectors into its own set. In either case, the result is that those 200 vectors are not correlated with any others in steps 720, 730, and 740. Step 750 may evaluate those vectors.

Methods of evaluation may vary. For example, one embodiment may correlate each stranded entry with one member of each subset identified in step 740. Depending on the resulting correlation values, that vector may be added to the subset with which it is most highly correlated, or may define a new subset. Alternatively, in some embodiments, it may be determined that such evaluation is too time-consuming and step 750 may be completely skipped.

Repeating the Correlation Process

Steps 710-750 may be repeated as needed for specific embodiments. As noted above, some embodiments will have reference data 220 having a large number of fields and a large number of entries, with many entries having data for only a subset of fields. In such a case, performing steps 710-750 on a single field is unlikely to derive all relevant information. Even in the simple example explained with reference to FIGS. 5, 6, and 8, correlating on the single field "last name" may provide only partial information about the correlation between those entries. For example, Jennifer Smith, corresponding to PIDNs 2 and 8 in FIG. 6, may be the same individual as Jennifer Brown, corresponding to PIDN 10, because PIDNs 2 and 10 may share a common account number. Performing the correlation on the last name field may not identify these PIDNs as corresponding to the same individual because they were evaluated only against other PIDNs sharing the same last name. Performing a correlation on the account number field may provide additional information about whether these PIDNs are related.

Thus, correlation across various data fields may be necessary to fully evaluate the degree of relatedness of the data in reference database 220.

Using Correlation Results to Update Reference Data

Once steps 710-760 are completed, reference database 220 has been distilled into a distilled database 230, as illustrated in FIG. 2. In some embodiments of the present invention, these two databases are handled separately and coexist with one another. In other embodiments of the present invention, a single database exists with records marked or otherwise identified as belonging to reference database 220 or distilled database 230. This may be accomplished by assigning by using different ranges of PIDNs for the records in the two databases. Furthermore, relationships between records in the two databases may be maintained by adding a constant value to the PIDN for the record in reference database 220 to generate a PIDN for the record in distilled database 230. For example, a record with a PIDN of 12345 in reference database 220 may have a PIDN of 9012345 in distilled database 230. In this manner, the two databases may be treated as distinct portions of a single database.

Using the Distilled Data

Once data dialysis process 700 is complete, distilled database 230 identifies subsets of data records from the reference database 220 as related records, and as noted above, probabilities may be determined for fields in the reference database 220 to provide a qualitative measure of their completeness. This may be accomplished by assigning a probability of completeness to each of the individual data fields and then using them to compute an overall probability of completeness for the data record. For example, for a data field representing a first name, a value of 'J' may be assigned a low probability (e.g., 0 or 0.1), a value of 'JOHN' may be assigned a higher probability (e.g., 0.7 or 0.8), and a value of 'JONATHAN' may be assigned the highest probability (e.g., 0.9 or 1.0). These values may be assigned somewhat arbitrarily. However, these values help identify which data fields in the set are most likely to include the most complete information or in other words, the most probable data.

Use of the present invention may determine a significant amount of information about the records and their relationship to each other, and may be specifically tailored for particular applications. Furthermore, using standard database operations, distilled database 230 (which references records of the reference database 220) may be manipulated to provide formatted reports as needed. For example, an embodiment may be tailored to generate a report listing subsets of related records, with records of a subset providing information about a specific individual or entity. The records within such a subset may provide information, for example about different fields of information; aliases and/or variations of names, addresses, social security numbers, etc., used by the individual; and fields—such as occupation, address, and account numbers—for which that individual may have more than one entry.

Recalling that all data is represented in numerical base-40 format, the subsets may be ordered numerically in the report. The base-40 format provides the additional advantage of representing alphabetical characters as their respective letters (as illustrated in the conversion table above). Thus, while the report will show entries in numerical representation, that representation retains the semantic significance of the data it represents, allowing the data to be manually read and analyzed. For example, if the report shows records for an individual having entries for names including J SMITH, JOHN SMITH, JOHN G SMITH, G SMITH, and GERALD SMITH, a person reading that report would understand that this individual uses various first names, including his first name or initial, his middle name or initial, or some combination thereof.

Adding New Data

As with conventional database applications, new data may be added from time to time. As illustrated in FIG. 2, the present invention accounts for adding new (or changed) data 240, which will affect reference database 220 and distilled database 230.

Generally, new data records 240 may be formatted as described with reference to FIG. 3, and entered into the existing reference database 220. Additionally, new data records 240 may be measured against distilled database 230 to determine if new information or content is available in new data record 240. For example, a new data record 240 may be correlated with data records from distilled database 230 to determine whether that new data record 240 is related to any data records already present in distilled database 230. If so, and new data record 240 contains information or content not already present in distilled database 230, new data record 240 may be used to update distilled database 230. For example, if new data record 240 included information for an individual named John Smith that corresponds to data records already present in distilled database 230 but provided the additional information that Mr. Smith's middle name was Greg, that additional information may be appropriately added to distilled database 230.

Changes to data records in reference database 220 and distilled database 230 may be handled using standard database protection operations, as described in references such as C. J. DATE, INTRODUCTION TO DATABASE SYSTEMS (Addison Wesley, 6th ed. 1994) (see specifically, Part IV), referenced above. For example, in the case that changes are made to reference database 220 by an authorized database administrator, related data records in reference database 220 are updated as determined by standard relational definitions and where appropriate, in accordance with relations defined in distilled database 230.

Various embodiments of the present invention may be used for many different applications, some of which have been described and/or alluded to above. For example, in the application described above, the invention may be used to combine billing information collected from multiple sources to derive a distilled database in which related data records are recognized and duplicate and erroneous data records are eliminated. As suggested, this may be particularly useful in cases, for example, involving fraud. Typically, persons using credit card or other forms of retail fraud make minor changes to certain pieces of their personal information while leaving the majority of it the same. For example, oftentimes, digits in a social security number may be transposed or an alias may be used. Often, however, other information such as the person's address, date of birth, mother's maiden name, etc., is used identically. These types of fraud are readily identified by the present invention, even though they are difficult to identify by human analyses.

Other possible applications include uses in telemarketing, to compile a list of targeted individuals or addresses, or in mail-order catalogs, to reduce a number of catalogs sent to the same individual or family. Still another potential application is in the medical research or diagnostics fields, in which nucleotide sequences of Adenine (A), Guanine (G), Cytosine (C), and Thymine (T) in nucleic acids may be identified.

In other embodiments, the present invention may be used as a gatekeeper for a particular database at the outset to maintain integrity of the database from the very beginning, rather than achieving integrity in the database at a later date. In these embodiments, no raw data 210 is present and only new data 240 exists. Before new data 240 is added to the database, it is measured against distilled database 230 to determine whether new data 240 includes additional information or content. If so, only that new information or content is added to distilled database 230 by updating an existing record in distilled database 230 to reflect the new information or content as would be apparent.

While this invention has been described in a preferred embodiment, other embodiments and variations are within the scope of the following claims. For example, formatting process 300 may format data using different radices or other character sets, and may use various data structures. The data structures may represent multiple fields, and depending on the application, will represent a variety of fields. For example, in a credit application, fields may include an account status, an account number, and a legal status, in addition to personal information about the account holder. In a medical diagnostic application, fields may include various alleles or other genetic characteristics detected in tissue samples.

What is claimed is:

1. A computer-implemented method for converting information from a raw database into a distilled database, the raw database including a plurality of records, each of the plurality of records including a data field, the data field including a plurality of data elements, the method comprising:

converting the plurality of data elements in at least one non-numeric data field of one of the plurality of records in the raw database to a numeric value, wherein said numeric value retains semantic significance of its corresponding plurality of data elements in the at least one non-numeric data field, wherein the numeric value has a corresponding number system, said number system having a radix at least equal to a number of possible values of a data element in the at least one non-numeric data field, and wherein numerals in the number system are selected to correspond to the data elements in the at least one non-numeric data field, said numeric value formed from said numerals in said number system corresponding to the data elements in the at least one non-numeric data field, thereby retaining semantic significance;

forming a vector including said numeric value, said vector representative of said one of the plurality of records in the raw database;

comparing said vector with a distilled matrix to determine whether said vector is included in said distilled matrix, said comparing using said numeric value;

including said vector in said distilled matrix if said vector is not included in said distilled matrix; and forming the distilled database using said distilled matrix.

2. The method of claim 1, further comprising:
maintaining information with said vector indicative of its origin in the raw database.

3. The method of claim 1, further comprising:
including said vector in a reference database; and
identifying an appropriate position for said vector in said reference database.

4. The method of claim 3, wherein said identifying an appropriate position for said vector comprises locating another vector similar to said vector.

5. The method of claim 4, wherein said locating another vector similar to said vector comprises numerically comparing said vector with said another vector.

6. The method of claim 3, further comprising locating a first vector in said reference database that is similar to a second vector in said reference database.

7. The method of claim 6, wherein said locating a first vector comprises locating said first vector in said reference database that is identifiable as said second vector in said reference database.

8. The method of claim 7, wherein said locating said first vector comprises locating said first vector in said reference database that is a duplicate of said second vector in said reference database.

9. The method of claim 6, further comprising forming a distilled vector from said first vector and said second vector that includes the best information from said first vector and said second vector.

10. The method of claim 9, wherein said comparing said vector with a distilled matrix comprises comparing said distilled vector with said distilled matrix to determine whether said distilled vector is included in said distilled matrix.

11. The method of claim 3, further comprising locating a first vector in said reference database that is dissimilar to every other vector in said reference database.

12. The method of claim 11, further comprising forming a distilled vector from said first vector.

13. The method of claim 12, wherein said comparing said vector with a distilled matrix comprises comparing said distilled vector with said distilled matrix to determine whether said distilled vector is included in said distilled matrix.

14. A computer-implemented method for converting information from a raw database into a distilled database, the raw database including a plurality of records, each of the plurality of records including a nonnumeric data field having a plurality of data elements, the method comprising:

converting a value of the plurality of data elements in the non-numeric data field of one of the plurality of records in the raw database to a numeric value represented in a first number system, said first number system having a radix at least equal to a number of possible values of each of the plurality of data elements, said first number system having numerals selected to correspond to the plurality of data elements so that said numeric value retains semantic significance with respect to said value of the plurality of data elements in the non-numeric data field;

forming a vector including at least said numeric value;

comparing said vector with the distilled database to determine whether said vector is included in the distilled database, said comparing using said numeric value; and including said vector in the distilled database if said vector is not included in the distilled database, wherein said including said vector in the distilled database comprises identifying an appropriate position for said vector in the distilled database.

15. A computer-implemented method for converting information from at least one raw database into a distilled database, the raw database including a plurality of records, each of the plurality of records including a data field, each data field including a data element, at least one data field being a non-numeric data field having a plurality of data elements, the method comprising:

converting a record in the raw database to a numeric vector, including converting the non-numeric data field having a plurality of data elements to a numeric value, wherein said numeric value retains semantic significance of its corresponding plurality of data elements in the non-numeric data field, wherein the numeric value has a corresponding number system, said number system having a radix at least equal to a number of possible values of a data element in the at least one non-numeric data field, and wherein numerals in the number system are selected to correspond to the data elements in the at least one non-numeric data field, said numeric value formed from said numerals in said number system corresponding to the plurality of data elements in the at least one non-numeric data field, thereby retaining semantic significance;

numerically comparing said numeric vector with a distilled matrix to determine whether said numeric vector is included in said distilled matrix;

including said numeric vector in said distilled matrix if said numeric vector is not included in said distilled matrix; and forming the distilled database using said distilled matrix.

16. A computer program product for converting information from a raw database into a distilled database, the raw database including a plurality of records, each of the plurality of records including a data field, the data field including a plurality of data elements, the computer program product comprising:

software instructions for enabling the computer to perform predetermined operations; and a tangible computer readable storage medium bearing the software instructions;

the predetermined operations including:

converting the plurality of data elements in at least one non-numeric data field of one of the plurality of records in the raw database to a numeric value, wherein said numeric value retains semantic significance of its corresponding plurality of data elements in the at least one non-numeric data field, wherein the numeric value has a corresponding number system, said number system having a radix at least equal to a number of possible values of a data element in the at least one non-numeric data field, and wherein numerals in the number system are selected to correspond to the data elements in the at least one non-numeric data field, said numeric value formed from said numerals in said number system corresponding to the plurality of data elements in the at least one non-numeric data field, thereby retaining semantic significance;

forming a vector including said numeric value, said vector representative of said one of the plurality of records in the raw database;

comparing said vector with a distilled matrix to determine whether said vector is included in said distilled matrix, said comparing using said numeric value;

including said vector in said distilled matrix if said vector is not included in said distilled matrix; and forming the distilled database using said distilled matrix.

17. A computer-implemented method for converting information from a raw database into a distilled database, the raw database including a plurality of records, each of the plurality of records including a plurality of data fields, at least one data field including a plurality of characters, the method comprising:

converting the plurality of characters in the at least one data field of one of the plurality of records in the raw database to a numeric value, said numeric value having a number system, said number system having a radix at least equal to a number of possible values of a character in the at least one data field, said number system having numerals selected to correspond to the plurality of characters, said numeric value formed from said numerals in said number system corresponding to the plurality of characters in the at least one data field so that said numeric value retains semantic significance of its corresponding plurality of characters in the at least one data field;

forming a vector including said numeric value, said vector representative of said one of the plurality of records in the raw database;

comparing said vector with a distilled matrix to determine whether said vector is included in said distilled matrix, said comparing using said numeric value;

including said vector in said distilled matrix if said vector is not included in said distilled matrix; and forming the distilled database using said distilled matrix.

18. The method of claim 17, further comprising:
maintaining information with said vector indicative of its origin in the raw database.

19. The method of claim 17, further comprising:
including said vector in a reference database; and
identifying an appropriate position for said vector in said reference database.

20. The method of claim 19, wherein said identifying an appropriate position for said vector comprises locating another vector similar to said vector.

21. The method of claim 20, wherein said locating another vector similar to said vector comprises numerically comparing said vector with said another vector.

22. The method of claim 19, further comprising locating a first vector in said reference database that is similar to a second vector in said reference database.

23. The method of claim 22, wherein said locating a first vector comprises locating said first vector in said reference database that is identifiable as said second vector in said reference database.

24. The method of claim 23, wherein said locating said first vector comprises locating said first vector in said reference database that is a duplicate of said second vector in said reference database.

25. The method of claim 22, further comprising forming a distilled vector from said first vector and said second vector that includes the best information from said first vector and said second vector.

26. The method of claim 25, wherein said comparing said vector with a distilled matrix comprises comparing said distilled vector with said distilled matrix to determine whether said distilled vector is included in said distilled matrix.

27. The method of claim 19, further comprising locating a first vector in said reference database that is dissimilar to every other vector in said reference database.

28. The method of claim 27, further comprising forming a distilled vector from said first vector.

29. The method of claim 28, wherein said comparing said vector with a distilled matrix comprises comparing said distilled vector with said distilled matrix to determine whether said distilled vector is included in said distilled matrix.

* * * * *